US011695826B2

(12) United States Patent
Wikoff

(10) Patent No.: US 11,695,826 B2
(45) Date of Patent: Jul. 4, 2023

(54) ASSIGNMENT OF PROCESSING RESOURCE BASED ON SESSION DATA

(71) Applicant: COMCAST CABLE COMMUNICATIONS, LLC, Philadelphia, PA (US)

(72) Inventor: Richard Wikoff, Yardley, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 772 days.

(21) Appl. No.: 15/676,765

(22) Filed: Aug. 14, 2017

(65) Prior Publication Data
US 2019/0052707 A1 Feb. 14, 2019

(51) Int. Cl.
| H04L 67/1014 | (2022.01) |
| H04L 65/1069 | (2022.01) |
| H04L 65/102 | (2022.01) |
| H04L 67/142 | (2022.01) |
| H04L 67/10 | (2022.01) |
| H04L 67/146 | (2022.01) |
| H04L 65/1045 | (2022.01) |
| H04L 65/1104 | (2022.01) |
| H04L 67/53 | (2022.01) |
| H04L 67/563 | (2022.01) |

(52) U.S. Cl.
CPC ........ *H04L 67/1014* (2013.01); *H04L 65/102* (2013.01); *H04L 65/1045* (2022.05); *H04L 65/1069* (2013.01); *H04L 65/1104* (2022.05); *H04L 67/10* (2013.01); *H04L 67/142* (2013.01); *H04L 67/146* (2013.01); *H04L 67/53* (2022.05); *H04L 67/563* (2022.05)

(58) Field of Classification Search
None
See application file for complete search history.

(56) References Cited

U.S. PATENT DOCUMENTS 10,164,934 B1 * 12/2018 Bittfield .............. H04L 61/1511
2009/0327521 A1 * 12/2009 Huotari .............. H04L 12/2809
709/240

(Continued)

FOREIGN PATENT DOCUMENTS

| EP | 2842051 A1 | 3/2015 | |
| PL | 2 720 434 | * 4/2014 | ............. H04L 29/08 |
| WO | WO-2013/163617 A1 | 10/2013 | |

OTHER PUBLICATIONS

IEEE: Interacting with the SOA Based Internet of Things Discovery Query Selection and OnDemand Provisioning of Web Services (Year: 2010).*

*Primary Examiner* — Nasser M Goodarzi
(74) *Attorney, Agent, or Firm* — Ballard Spahr LLP

(57) ABSTRACT

Methods and systems for processing communication systems are disclosed. A request for a communication session can be analyzed to determine a device or pool of devices to process the communication session. Data associated with the communication session, including session description data, can be analyzed using rules that associate types of data with corresponding processing devices. The rules can be based on levels of complexity associated with the data, and different pools of processing devices can be associated with different levels of complexity. Thus, communication sessions assigned a level of complexity can be matched with pools of devices associated with the same level of complexity.

20 Claims, 5 Drawing Sheets

(56) References Cited

U.S. PATENT DOCUMENTS

| | | | |
|---|---|---|---|
| 2010/0046535 A1* | 2/2010 | Bugenhagen | H04L 65/1046 |
| | | | 370/401 |
| 2010/0306354 A1* | 12/2010 | DeHaan | G06F 1/3203 |
| | | | 709/222 |
| 2014/0214940 A1* | 7/2014 | Hill | H04L 65/403 |
| | | | 709/204 |
| 2014/0258551 A1 | 9/2014 | Ye et al. | |
| 2014/0280595 A1 | 9/2014 | Mani et al. | |
| 2016/0105468 A1* | 4/2016 | Mufti | H04L 65/1069 |
| | | | 709/228 |

* cited by examiner

ASSIGNMENT OF PROCESSING RESOURCE BASED ON SESSION DATA

BACKGROUND

A network may receive a variety of requests for communication sessions with differing media handling requirements. The cost and complexity of processing these communication sessions can vary widely. Typical session routing behavior fails to address the efficient application of resources of differing cost and complexity, such as cloud resources, resulting in inefficient and costly application of processing resources. Thus, there is a need for more efficient methods and systems for processing communication sessions.

SUMMARY

It is to be understood that both the following general description and the following detailed description are examples and explanatory only and are not restrictive. Provided are methods and systems for processing (e.g., routing, supporting, managing) communication sessions between users. The communication sessions can comprise multimedia calls between users, such as voice calls, video calls, and/or more complex media rich applications. A plurality of session devices, such as session border controllers, can be divided into one or more pools of devices for processing the communication sessions. Each of the pools can be associated with corresponding types of data, levels of complexity, and/or levels of cost. One or more rules can be determined for redirecting requests for communication sessions to appropriate pools of session devices (e.g., session border controllers). An incoming request for a communication session can be received at a session device from a source device for an intended target device. Data in the request can be extracted and analyzed based on the one or more rules. The data can comprise session description data, such as one or more codecs, protocols, protocol versions, media requirements, and/or other parameters (e.g., initialization parameters). The one or more rules can associate types of session description data with corresponding pools of session devices. The one or more rules can also associate types of session description data with levels of complexity, cost, and/or other factors that can be associated with the pools of session devices. A pool of session devices can be selected based on the analysis of the data using the one or more rules. The request can then be redirected to the selected pool of session devices to further initialize and support the communication session.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, are examples and together with the description, serve to explain the principles of the methods and systems.

DETAILED DESCRIPTION

Figure 1:
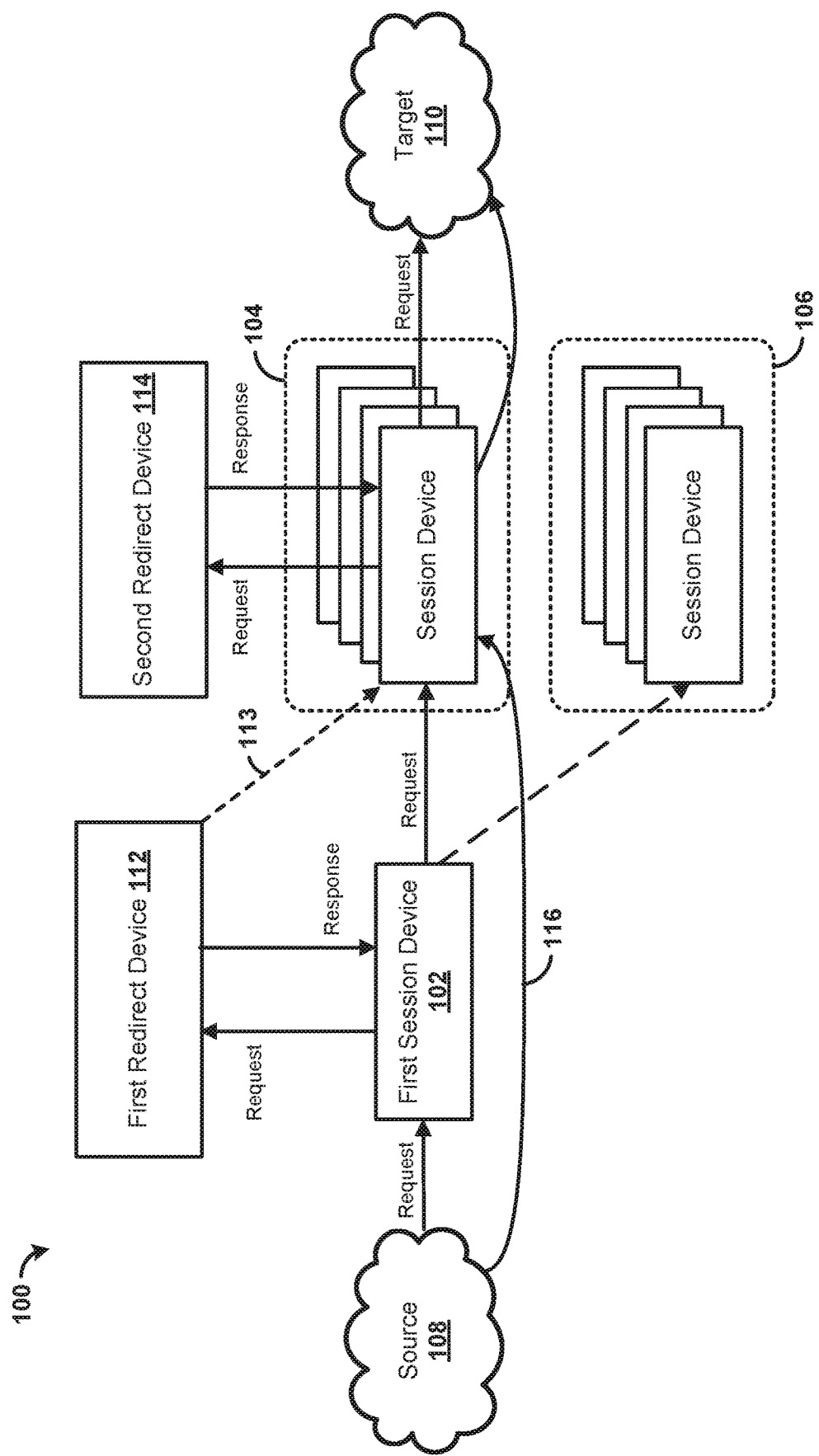
FIG. 1 is a block diagram of an example system for processing communication sessions.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all examples of this application including, but not limited to, steps in disclosed methods. Thus, if there are a variety of additional steps that can be performed it is understood that each of these additional steps can be performed with any specific example or combination of examples of the disclosed methods.

The present methods and systems may be understood more readily by reference to the following detailed description of the examples included therein and to the Figures and their previous and following description.

As will be appreciated by one skilled in the art, the methods and systems may take the form of an entirely hardware examples, an entirely software examples, or an example combining software and hardware examples. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various examples, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various examples, the content items described herein may include electronic representations of music, spoken words, or other audio, which may include but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP), Sound Document (.ASND) format or some other format configured to store electronic audio whether such format is presently known or developed in the future.

In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some examples, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to routing of communication sessions, such audio/video communications over a network between devices. In network boundary architecture, media resources can be allocated to calls (e.g., communication sessions between devices) in a wasteful manner. Ingress traffic to a network can comprise a mix of calls that present differing media handling requirements. An efficient vendor-independent method is needed to separate different types of traffic so that calls can be directed to media devices that best match the processing requirements. For example, calls requiring transcoding of complex codecs can be routed to high-capability media devices, while calls that require only pass-through media processing can be routed to less costly devices that are optimized for pass-through. In this way, resources are not stranded and are not consumed by calls that can be handled by a simpler, cheaper device. Complicating the issue is that the communication path (e.g., session initiation protocol signaling path) may be established before parameters (e.g., such as codec) are agreed upon by the target device of the communication session (e.g., via a session description protocol answer/response message). Thus, the parameters in an initial request may not fully reflect the parameters later agreed upon for the communication session.

The present methods and systems introduce a session redirect device that can redirect requests for communication sessions to the most efficient processing pool. The session redirect device can analyze data in requests, such as session description data, based on one or more rules. The rules can associate particular parameters, such as codecs, with levels of complexity. A variety of pools of session devices (e.g., session border controllers) can be associated with corresponding levels of complexity, specific parameter values (e.g., codecs), and/or the like. For example, high definition codecs can be associated with a pool of devices for processing high complexity level communication sessions. Standard definition codecs can be associated with a pool of devices for processing medium complexity level communication sessions. Simple codecs can be associated with a pool of session devices for processing low complexity level communication sessions. Thus, the session redirect device can redirect the requests to the appropriate session devices (e.g., or pools of session devices), thereby preventing the use of high complexity (e.g., and high cost) resources to process low complexity or medium complexity communication sessions.

The disclosed architecture can be optimized by routing different communication sessions differently based on a history of communication sessions from a particular source. Vendor-specific optimization is possible, e.g., among a set of session devices from Vendor A, but these optimization approaches use proprietary signaling to direct the media traffic. This causes the approaches to suffer from vendor lock-in, as Vendor B cannot leverage a service provider's extensive investment in Vendor A's equipment. Load balancers can also distribute traffic, but do so indiscriminately and not with any intelligence about which media resource are available. Accordingly, as described herein, the present methods and systems improve the technological process of routing communication sessions in a network.

FIG. 1 is a block diagram of another example system 100 for processing communication sessions. A plurality of session devices (e.g., session border controllers, session processing devices) can be divided into pools (e.g., groups). A pool can be made up of one or more session devices. The session devices can be divided into pools based a variety of factors, such as the media capabilities of the session devices. For example, high capability and/or higher cost transcoding devices can be assigned to a first session device pool. Lower capability and/or lower cost devices can be assigned to a second session device pool. A session device can be inserted in the network between a source device and the existing session device layer. This configuration can use existing session device functionality to provide a secure border, assign a session device and/or pool of session devices to handle a communication session, and redirect a request for a communication session to the assigned session device and/or pool of session devices. This configuration allows a service provider to apply rules to shape traffic flows that transcode or anchor media on the most effective session device pool for the purpose. The present methods and systems can be applied specifically to a system of one or more pools of session devices that are implemented as cloud-based resources. Anchored calls (e.g., associated with less cost/complexity) that pass through the media without transcoding can be routed to a cloud session device pool. On the other hand, high definition (HD) codecs (e.g., associated with greater cost/complexity) can be routed to a pool of session devices with significant hardware transcoding (e.g., DSP) capability.

The system 100 can comprise a first session device 102 of a plurality of session devices. The plurality of session devices can comprise session border controllers. The plurality of session devices can be configured to process (e.g., establish, route, manage, maintain, support, transcode) communication sessions. For example, the communication sessions can comprise multimedia communication sessions supporting a variety of communication formations, such as audio, video, text, graphics, and/or the like. For example, a communication session can comprise a voice over internet protocol session, internet telephony session, and/or the like based communication session. The first session device 102 can be deployed separate from any pools of session devices. For example, the first session device 102 can optionally be located geographically close to an interexchange point where traffic is received from another carrier.

The plurality of session devices can comprise a first pool 104 of session devices. The plurality of session devices can comprise a second pool 106 of session devices. The first pool 104 can be remotely located from the second pool 106. The first pool 104 can comprise a cloud based pool of processing devices managed by a third party. The second pool 106 can be managed by a service provider. The first pool 104 can have different capabilities than the second pool 106. The second pool 106 can be configured to handle different media types than the first pool 104. The first pool 104 can have a different cost than the second pool 106. As explained further herein, the first pool 104 and/or the second pool 106 can be associated (e.g., based on rules of a service provider) with corresponding levels of complexity. The first pool 104 and the second pool 106 can be managed by the same entity, such as the service provider. Additionally, the first pool 104 can be managed by the third party. The second pool 106 can be managed by the service provider.

The first session device 102 can receive a request for a communication session. The request can be received from a source 108 (e.g., source device, source network). The request can comprise a request for a communication session with a target 110 (e.g., target device, target network). The request can comprise a session initiation protocol (SIP) based request message. For example, the request can comprise a SIP invite message.

The first session device 102 can be configured to transmit (e.g., forward), the request to a first redirect device 112. Additionally, the first session device 102 can be configured to transmit a message to the first redirect device 112 in response to receiving the request. The message transmitted to the first redirect device 112 can request a destination for transmitting the received request.

The first redirect device 112 can be configured to determine a session device of the plurality of session devices to process the request. The first redirect device 112 can also be configured to determine a pool of session devices (e.g., the first pool 104, the second pool 106) to process the request. The first redirect device 112 can determine request data (e.g., session data) in the request. The request data can comprise data related to the requested communication session. The request data can comprise parameters (e.g., proposed parameters, initialization parameters) for the communication session. The parameters can comprise codecs, protocols, protocol versions, modes, routes, resolution, bit rate, format, and/or the like. The data in the request can comprise session description data (e.g., formatted based on session description protocol). The session description data can comprise a session description section, a time description section, a media description section, and/or the like.

The session description data can comprise a media descriptor field (e.g., attribute, line). The media descriptor field can be located in the media description section. The media descriptor field can be of the format "m=<media><port><proto><fmt>" where <media> represents a media type (e.g., audio, video), <port> represents a network port number, and <proto> represents a protocol (e.g., real-time transport protocol). A media descriptor field can be associated with (e.g., followed by) one or more media attributes (e.g., media-level attribute, media attribute line, media attribute field). An example media attribute can be of the format "a=<attribute>:<value>" where <attribute> can represent a particular attribute and <value> can represent a value of the particular attribute. As a further example, an example media attribute can be of the form "a=rtpmap: <payload type><encoding name>/<clock rate>[/<encoding parameters>]" where rtpmap is an attribute that maps from a real-time protocol payload type number (e.g., as used in an "m=" line) to an encoding name denoting the payload format to be used. Additionally, the rtpmap attribute can comprise information on the clock rate and encoding parameter.

The first redirect device 112 can determine that the request comprises multiple proposed codecs. The first redirect device 112 can be configured to determine the codecs in multiple media attributes following a single media descriptor field. For example, session description data can comprise one media descriptor field (e.g., "m==") followed by multiple media attributes (e.g., a=rtpmap). Such format is as follows:

m=audio 29764 RTP/AVP 0 18 101
a=rtpmap:0 PCMU/8000
a=rtpmap:18 G729/8000
a=fmtp:18 annexb=no
a=rtpmap:101 telephone-event/8000

Using the above example, the first redirect device 112 can determine that the request proposes PCMU, G729, and telephone-event as possible codecs. PCMU, which is listed first, can be the first/preferred codec of the source 108. The first redirect device 112 can identify PCMU as the preferred codec because PCMU occurs first. The first redirect device 112 can be configured to determine the codecs in media attributes following multiple media descriptors attributes. Additionally, the session description data can comprise multiple media descriptor field (e.g., "m=") each followed by an associated media attribute (e.g., "a=rtpmap"). Such format is as follows:

m=audio 29764 RTP/AVP 0
a=rtpmap:0 PCMU/8000
m=audio 29858 RTP/AVP 18
a=rtpmap:18 G729/8000

Using the above example, the first redirect device 112 can determine that the request proposes PCMU, G729 as possible codecs.

The first redirect device 112 can determine the session device to process the request based on one or more rules. The one or more rules can be used to analyze the data (e.g., session description data) in the request, such as values of one or more parameters in the request. The one or more rules can comprise rules associating pools of session devices (e.g., or individual session devices) with corresponding types of data. For example, the one or more rules can associate one or more session devices (e.g., or pools of session devices) with corresponding data types, such as High Definition (HD) codecs (e.g., AMR-WB), Standard Definition (SD) codecs, simple transcodes (e.g., G.711 to G.729), pass-through codecs, IPv4 sessions, IPv6 sessions, RFC 4733 DTMF (e.g., telephone-event) transcoding, and/or the like. The associations between the data types and the corresponding session devices can be based on (e.g., assigned based on) shared levels of complexity. For example, a data type can be associated with a particular session device based on both the data type and the session device being assigned (e.g., or otherwise associated with) the same level of complexity.

Further, example data types (e.g., codecs) can comprise PCMU, FS-1016 CELP, G721 G726-32, GSM, G723, DVI4, DVI4, LPC, PCMA, G722, L16, QCELP, CN, MPA, G728, DVI4, DVI4, G729, CN, CELB, JPEG, nv, H261, MPV, MP2T, H263, H263-1998, H263-2000, H264 AVC, H264 SVC, H265, theora, iLBC, PCMA-WB, PCMU-WB, G718, G719, G7221, G726-16, G726-24, G726-32, G726-40, G729D, G729E, G7291, GSM-EFR, GSM-HR-08, AMR, AMR-WB, AMR-WB+, vorbis, opus, speex, mpa-robust, MP4A-LATM, MP4V-ES, mpeg4-generic, VP8, VP9, L8, DAT12, L16, L20, L24, raw, ac3, eac3, t140, EVRC, EVRC0, EVRC1, EVRCB, EBRCB0, EVRCB1, EVRCWB, EVRCWB0, EVRCWB1, jpeg2000, UEMCLIP, ATRAC3, ATRAC-X, ATRAC-ADVANCED-LOSSLESS, DV, BT656, BMPEG, SMPTE292M, RED, VDVI, MP1S, MP2P, tone, telephone-event, aptx, a combination thereof, and/or the like.

The one or more rules can comprise rules associating pools of session devices (e.g., or individual session devices) with corresponding levels of data complexity, levels processing complexity, levels of bandwidth, levels of cost, and/or the like. These levels of data complexity, levels processing complexity, levels of bandwidth, levels of cost, and/or the like can also be associated with the data types (e.g., or data values). Thus, in some implementations the rules inherently account for complexity (e.g., or cost or bandwidth), while in other implementations, complexity (e.g., or cost or bandwidth) can be explicitly determined as part of analysis of the data.

The one or more rules can comprise a rule associating codecs with corresponding levels of complexity, levels of cost, processing pools, and/or the like. The rule associating codecs with corresponding levels of complexity can assign greater weight to a codec based on a position of the codec within the session description data. For example, a first listed codec can have a greater weight than a second listed codec in determining what level of complexity to assign to a request. The first listed codec can be located in an attribute line before (e.g., or above) an attribute line in which the second listed codec is located.

The levels of complexity can relate to processing complexity, data complexity (e.g., resolution, bit rate), processing cost (e.g., cost to process a type of communication session), and/or the like. The levels of data complexity can be established according to any appropriate scheme. The levels of data complexity can be assigned based on a scale from low to high or high to low. Each level can be represented by a number, a term, a symbol, and/or the like. The scale can be subdivided discretely or be continuous. For example, the levels of complexity can comprise low, medium, and high. As another example, the levels of complexity can be any number between two end points (e.g., 0 to 10, 1 to 100, 0 to 1000).

A lowest level of complexity can be associated with communication sessions where no transcoding is required (e.g., information is merely anchored or relayed). A low level of complexity can be associated with a first group of codecs, such as G.711 (PCMU or PCMA), G.729, telephone-event (e.g., inhand DTMF based on RFC 4733), and/or the like. A medium level of complexity can be associated with a second group of codecs, such as Medium for ILBC, AMR (AMR Narrowband), and/or the like. A high level of complexity can be associated with a third group of codecs, such as G.722, EVRCB, AMR-WB, and/or the like. In some scenarios, theses codecs may be assigned to different levels of complexity. For example, for a mobile voice provider whose subscriber endpoints support AMR-WB, the relative costs of processing codecs may be different than a service provider, such as a cable based provider.

The following are several examples of rules associating codec with corresponding session devices (e.g., or pools of session devices):

IF [NOT] the FIRST SDP CODECs matches {x}, THEN assign communication session to pool {a}
IF [NOT] ANY of the SDP CODECs match {x}, THEN assign communication session to pool {a}
IF [NOT] ALL of the SDP CODECs match {x, y}, THEN assign communication session to pool {a}
IF [NOT] ONLY the SDP CODECs match {x, y}, THEN assign communication session to pool {a}

IF [NOT] the SDP CODEC list is EMPTY, THEN assign communication session to pool {a}

A further explanation of the rules is described as follows. It should be noted that the usage of "[NOT]" in any rules herein indicates that the rule can optionally be implemented with using logic that includes the usage of a NOT condition. Additionally, though the rules assign communication sessions to pools of session devices, it should be understood that the rule can assign a communication to a specific session device (e.g., with or without assigning the communication session to an entire pool of session devices).

A first rule can comprise "IF [NOT] the FIRST SDP CODECs matches {x}, THEN assign communication session to pool {a}," where {x} represents a specified codec and {a} represents a specified pool of session devices (e.g., the first pool 104, the second pool 106) The first rule can instruct a device (e.g., first redirect device 112) to check the first SDP CODEC listed in the SDP list. The first SDP CODEC can be the offerer's (e.g., source 108) preferred CODEC. If the first SDP codec is associated with a high cost (e.g., expensive to transcode), high data complexity, high processing complexity, and/or the like, the first rule can instruct the device to assign the associated communication session to a high-capability transcoding SBC. If the first SDP codex is associated with a low cost, low data complexity, low processing complexity, and/or the like. The communication session can be assigned to a lower-capacity or a cloud based transcoding unit.

A second rule can comprise "IF [NOT] ANY of the SDP CODECs match {x}, THEN assign communication session to pool {a}," where {x{ represents a specified codec and {a} represents a specified pool of session devices (e.g., the first pool 104, the second pool 106). The second rule would instruct a device (e.g., the first redirect device 112) to check all of the proposed codecs in an offer list. If any of the proposed codes match {x}, then a certain action can be triggered, such as assigning the communication session to a pool associated with the codec, to a pool associated with a type of the codec, and/or the like. For example, the second rule can be used to screen for an expensive codec "x" in the offer list, e.g., to route to a high-capability transcoding SBC.

A third rule can comprise "IF [NOT] ALL of the SDP CODECs match {x, y}, THEN assign communication session to pool {a}," where {x, y} represents two specified codecs and {a} represents a specified pool of session devices (e.g., the first pool 104, the second pool 106). The third rule can instruct a device (e.g., the first redirect device 112) to check all of the SDP codecs (e.g., in an offer list) to determine if codec x and codec y are among the listed codecs. For example, the statement can be true if the listed codecs are {x, y, z} and the rule specifies codecs {x, y}.

A fourth rule can comprise "IF [NOT] EXACTLY the SDP CODECs match {x, y}, THEN assign communication session to pool {a}," where {x, y} represents two specified codecs and {a} represents a specified pool of session devices (e.g., the first pool 104, the second pool 106). The fourth rule can instruct a device (e.g., the first redirect device 112) to check all of the SDP codes (e.g., in an offer list) to determine if the listed codecs exactly match the codecs specified in the rule, {x, y}. For example, the statement can be true if the listed codecs are {x, y} and the rule specifies codecs {x, y}. The statement would not be true if the listed codecs are {x, y} and the rule specifies codecs {x, y, z}. These rules can be used to match several of the codecs in the request (e.g., offer list). These rules can be used when a particular peer carrier sends predictable, repeating traffic.

A fifth rule can comprise "IF [NOT] the SDP CODEC list is EMPTY, THEN assign communication session to pool {a}," where EMPTY indicates that no offer for a codec is listed in the SIP INVITE. The fifth rule can instruct a device (e.g., the first redirect device 112) to match an empty offer (e.g., no codec listed, meaning that the call originator requests an offer from the recipient). An empty offer can be given as a part of a feature flow like a call transfer. In this infrequent case, the first redirect device 112 can be configured to assign, without any codec information, a communication session to a pool of session devices. In some scenarios, the selected pool {a} (e.g., or specific SBC) can be a pool of high-capability transcoding SBCs (e.g., or a specific high-capability transcoding SBC). For example, the high-capability transcoding SBC can be configured to handle any scenario for processing communication sessions.

The one or more rules can comprise a rule that associates versions of internet protocol (e.g., IPv4, IPv6) and/or other protocols with corresponding levels of complexity, levels of cost, processing pools, and/or the like. For example, the rule can associate internet protocol version 4 with a first level of complexity and internet protocol version 6 with a second level of complexity (e.g., or vice versa). The following are examples of rules associating other versions of protocols with corresponding session devices (e.g., or pools of session devices):

IF [NOT] ANY of the SDP ADDRTYPEs match {"IP6"}, THEN assign communication session to pool {a}
IF [NOT] ALL of the SDP ADDRTYPEs match {"IP4"}, THEN assign communication session to pool {b}

As a further explanation, a sixth rule can comprise "IF [NOT] ANY of the SDP ADDRTYPES match {"IP6"}, THEN assign communication session to pool {a}," where {IP6} is an identifier of internet protocol version 6 (IPv6) and {a} represents a specified pool of session devices (e.g., the first pool 104, the second pool 106). The sixth rule can instruct a device (e.g., the first redirect device 112) to determine if an address type in a request message (e.g., SIP invite) comprises an identifier of internet protocol version 6 (IPv6). If the address type matches IPv6, then the device can assign the communication session to pool {a}. For example, pool {a} can comprise a pool of session devices assigned to process communication sessions using IPv6 protocol.

A seventh rule can comprise "IF [NOT] ALL of the SDP ADDRTYPEs match {"IP4"}, THEN assign communication session to pool {b}," where {"IP4"} is an identifier of internet protocol version 4 (IPv4) and {b} represents a specified pool of session devices (e.g., the first pool 104, the second pool 106). The seventh rule can instruct a device (e.g., the first redirect device 112) to determine if an address type in a request message (e.g., SIP invite) comprises an identifier of IPv6. If the address type matches IPv6, then the device can assign the communication session to pool {b}. For example, pool {b} can comprise a pool of session devices assigned to process communication sessions using IPv6 protocol.

An example request for a communication session sent by the source 108 can comprise session information (e.g., session description protocol based data) shown as follows:

v=0
o=* 1401717764 1401717764 IN IP4 10.1.95.91
s=-
c=IN IP4 10.1.95.91
t=0 0
m=audio 29764 RTP/AVP 0 18 101
a=rtpmap:0 PCMU/8000
a=rtpmap:18 G729/8000 a=fmtp:18 annexb=no
a=rtpmap:101 telephone-event/8000
a=fmtp:101 0-15
a=sendrecv
a=silenceSupp:off - - -

The letters can indicate session fields with proposed field values (e.g., parameter values) for a communication session. A proposed codec can be indicated by an "a=rtpmap" attribute (e.g., or attribute line), which can provide attributes for the preceding "m=" (media) attribute (e.g., media line). In this example request, the source 108 offers multiple codecs, such as PCMU, G.729, and telephone-event (e.g., inband DTMF based on RFC 4733). The "c=" attribute (e.g., a connection information field, or connection attribute) indicates the version of internet protocol that is used. For example the "IP4" portion of the "c=" attribute indicates that IPv4 proposed for the communication session.

The first redirect device 112 can transmit a message in response to determining the session device to process the request. The first redirect de vice 112 can transmit a response to the first session device 102. The response can comprise a redirect message configured to cause redirection of the request to the determined session device (e.g., or pool of the session device). The redirect message can indicate the determined session device (e.g., or pool of the session device). For example, the redirect message can comprise a SIP 302 redirect message.

The first redirect device 112 can transmit a message, such as the original request, directly to the determined session device (e.g., or pool of the session device), as shown by line 113. In some implementations, the first session device 102 can implement the functionality of the first redirect device 112. For example, the first session device 102 can be configured to determine the session device (e.g., or pool of session devices) to process the request based on the one or more rules described herein. As a further example, the first redirect device 112 can act as a SIP proxy.

The system 100 can comprise a second redirect device 114. The second redirect device 114 can be configured to assist one or more of the pools of session devices in determining a route for the communication session. The second redirect device 114 can be configured to determine information (e.g., an address, an identifier, a location, a network) associated with the target 110. For example, one or more of the session devices of the first pool 104 and/or the second pool 106 can be configured to transmit a request (e.g., by forwarding the request from the source or by generating a new request) to the second redirect device 114. The second redirect device 114 can determine the information associated with the target 110. The second redirect device 114 can transmit a response to the requesting session device. The second redirect device 114 can comprise a SIP redirect server. The second redirect device 214 can be configured to implement a Number to URI Mapping (ENUM) service. The second redirect device can 114 be configured to determine a target identifier for processing the request. The target identifier can comprise a number, such as a telephone number of the target. The target identifier can comprise a uniform resource identifier, such as a network address of the target 110. For example, the second redirect device 114 can determine a number based on a network address and/or determine a network address based on a number.

After the route for the communication session is determined, a communication session can be established between the source 108 and the target 110. For example, a communication session can be established based on real-time protocol (RTP). The session device assigned to the communication session can facilitate the communication session (e.g., based on a RTP media path) between the source 108 and the target 110. An example communication path 116 for an established communication session is shown in FIG. 1. The communication path 116 may not include the first redirect device 112, the first session device 102, the second redirect device 114, and/or other devices in the system 100. The system 100 can be implemented with additional functionality. Because the present methods and systems are predictive rather than reactive, the rules can be designed to predict which codec will be selected by the target 110. The accuracy of the prediction may depend upon the regularity of the traffic.

Once the route for the communication session is determined, the request can be transmitted (e.g., forwarded) to the target 110. The target 110 can respond to the request with an answer message. The answer message can comprise session information accepted by the target 110. For example, the target 110 can accept a communication protocol (e.g., codec) and one or more other parameters for the communication session. The target 110 (e.g., end client, server) can reply to the source 108 with an example answer comprising session information as follows:

v=0
o=******* 1328232605 1949552628 IN IP4 10.2.251.54
s=SIP Media Capabilities
c=IN IP4 10.2.251.52
t=0 0
m=audio 16482 RTP/AVP 0 101
a=rtpmap:0 PCMU/8000
a=rtpmap:101 telephone-event/8000
a=fmtp:101 0-15
a=sendrecv
a=maxptime:20

In this example answer, the target 110 accepts the use of the PCMU codec and the telephone-event payload format. For example, the line comprising "a=rtpmap:0 PCMU/8000" indicates that the PCMU codec is accepted. The line comprising "a=rtpmap:101 telephone-event/8000" indicates that the telephone-event codec is accepted.

Figure 2:
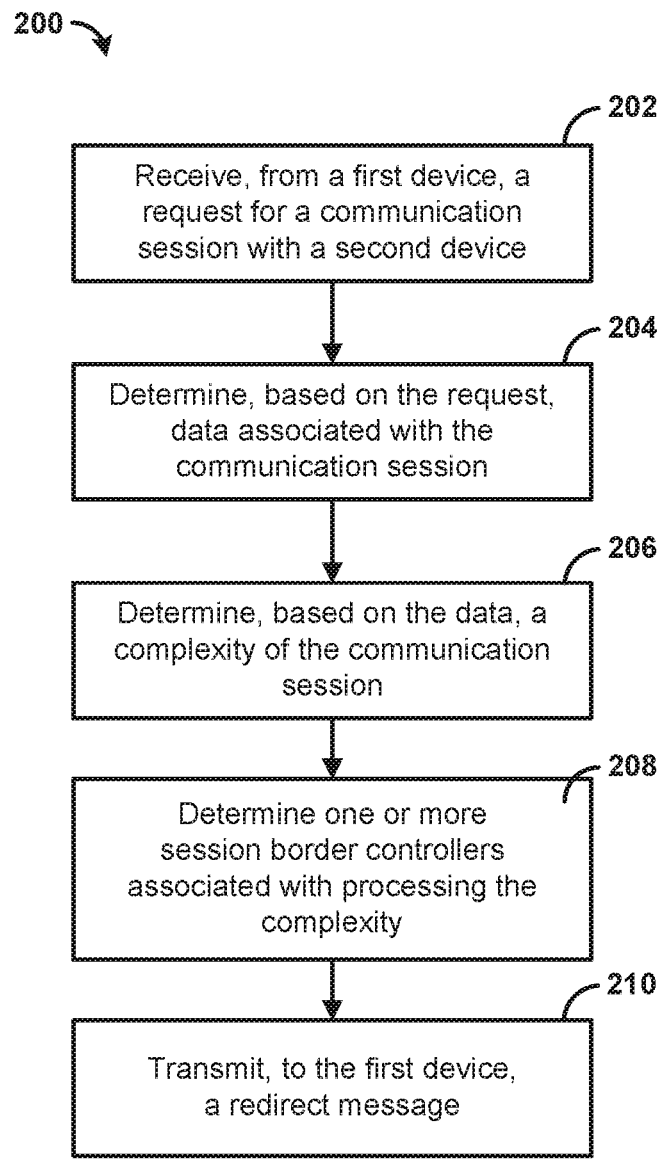
FIG. 2 is a flowchart of an example method for processing communication sessions.

FIG. 2 is a flowchart of an example method 200 for processing a communication session. At step 202, a request for a communication session can be received. The request can comprise a session initiation protocol invite message. The request can be received from a first device. The first device can comprise a session border controller. The first device can comprise a session device configured to process (e.g., establish, route, manage, maintain, support) communication sessions. The request can be a request to establish the communication session with a second device (e.g., a target device). The request can be received by a third device. The third device can comprise a redirect server, such as a SIP redirect server. The request can be received indirectly (e.g., or in some scenarios directly) from a source device. For example a source device can attempt to establish a communication session with the second device (e.g., the target device).

At step 204, based on the request, data associated with the communication session can be determined (e.g., by the third device). The data can comprise session description data. The session description data can comprise data formatted according to a session description protocol. The session description data can comprise a session description section, a time description section, a media description section, and/or the like. The session description data can comprise parameters (e.g., proposed parameters, initialization parameters) for the communication session. The parameters can specify values for codecs, protocols, protocol versions, modes, routes, a resolution, a bit rate, a format, and/or the like.

Determining the data associated with the communication session can comprise determining a codec based on the request (e.g., proposed by the request). The codec can be one of a plurality of codecs proposed by the request. The plurality of codecs can be listed in order of preference (e.g., with the highest preference listed first, or otherwise indicated). The codec can be determined from a media description section of session description data. The codec can be determined from a media attribute. The media attribute can be associated with (e.g., follow) a media descriptor field. The media attribute can comprise an rtpmap attribute configured to map an RTP payload type number (e.g., as used in a media descriptor field/line) to an encoding name denoting the payload format to be used. The RTP payload type number can be a number associated with a particular codec. For example, the codec can be determined based on the RTP payload type number, a name of the code (e.g., in the media attribute), any other appropriate identifier, and/or the like.

Determining the data in the request can comprise determining a version of a protocol, such as IPv4, IPv6, and/or the like. The version of the protocol can be determined from a connection information field (e.g., or connection data field, indicated as "c="). The connection information field can comprise the version of the protocol. For example, the connection information field can comprise an address type field comprising an identifier of the protocol. For example, IPv4 can be identified as IP4. IPv6 can be identified as IP6. The protocol can be determined based on the identifier in the address type field.

At step 206, a complexity (e.g., data complexity) of the communication session can be determined (e.g., by the third device). The complexity can be determined based on the session description data. The complexity can be determined by analyzing the session description data based on one or more rules associating types of data with corresponding levels of data complexity.

The levels of complexity can relate to processing complexity, data complexity (e.g., resolution, bit rate), processing cost (e.g., cost to process a type of communication session), and/or the like. The levels of complexity can be established according to any appropriate scheme. The levels of complexity can be assigned based on a scale from low to high or high to low. Each level can be represented by a number, a term, a symbol, and/or the like. The scale can be subdivided discretely or be continuous. For example, the levels of complexity can comprise low, medium, and high. As another example, the levels of complexity can be any number between two end points (e.g., 0 to 10, 1 to 100, 0 to 1000).

The one or more rules associating types of data with corresponding levels of complexity can comprise can comprise one or more rules that associate data types, such as High Definition (HD) codecs (e.g., AMR-WB), Standard Definition (SD) codecs, simple transcodes (e.g., G.711 to G.729), pass-through codecs, IPv4 sessions, IPv6 sessions, RFC 4733 DTMF transcoding, and/or the like, with corresponding levels of complexity.

The one or more rules associating types of data with corresponding levels of data complexity can comprise a rule associating codecs with corresponding data complexity. The data complexity can be determined by analyzing each of a plurality of codecs based on the one or more rules. A first listed (e.g., or otherwise indicated as highest priority) codec can be given greater weight than subsequently listed codecs in the session description data. The first listed codec can be listed in a first media attribute associated with (e.g., immediately following) a media descriptor field. The media descriptor field can be a first listed media descriptor field in the session description data.

The one or more rules associating types of data with corresponding levels of data complexity can comprise can comprise a rule that associates versions of internet protocol with corresponding data complexities. As an example, a lowest level of complexity can be associated with communication sessions where no transcoding is required (e.g., information is merely anchored or relayed). A low level of complexity can be associated with a first group of codecs (e.g., simple codecs), such as G.711 (PCMU or PCMA), G.729, telephone-event (e.g., inband DTMF based on RFC 4733), and/or the like. A medium level of complexity can be associated with a second group of codecs (e.g., standard definition codecs), such as ILBC, AMR (AMR Narrowband), and/or the like. The second group of codecs can require a higher level of complexity to process than the first group of codecs. A high level of complexity can be associated with a third group of codecs (e.g., high definition codecs), such as G.722, EVRCB, AMR-WB, and/or the like. The third group of codecs can require a higher level of complexity to process than the first group of codecs and the second group of codecs. In some scenarios, theses codecs may be assigned to different levels of complexity. For example, for a mobile voice provider whose subscriber endpoints support AMR-WB, the relative costs of processing codecs may be lower than a service provider, such as a cable based provider, which performs additional processing to make communication data compatible with a subscriber endpoint.

At step 208, one or more session border controllers associated with the data complexity can be determined (e.g., by the third device). The one or more session border controllers can be determined from a plurality of session border controllers assigned to corresponding pools of session border controllers. Each pool (e.g., or each border controller) can be associated with a corresponding complexity. For example, each pool (e.g., or each border controller) can be assigned (e.g., by a service provider) to process communication sessions of a corresponding complexity.

The pools of session border controllers can comprise a first pool associated with a first complexity and second pool associated with a second complexity greater than the first complexity. The second pool can be managed by a party (e.g., service provider) that generated the one or more rules. The first pool can be managed (e.g., owned, hosted, leased) by a third party. For example, the third party can manage a cloud based processing service. The cloud based processing service can implement the session border controllers via virtual machines and/or physical devices. As another example, the first pool and the second pool can be managed by the same party, such as the service provider). The service provider can manage the cloud based processing service. The first pool can be managed by the third party.

At step 210, a redirect message can be transmitted (e.g., by the third device). The redirect message can be transmitted to the first device. The redirect message can be configured to direct the first device to use the determined one or more session border controllers (e.g., or pool of session border controllers) for the communication session. The redirect message can be configured to cause the first device to direct (e.g., forward, transmit) the request to the one or more session border controllers. The one or more session border controllers can establish the communication session between the source user device and the target user device. For example, the one or more session border controllers can determine a telephone number, network address, and/or other information for establishing communication with the target user device.

Figure 3:
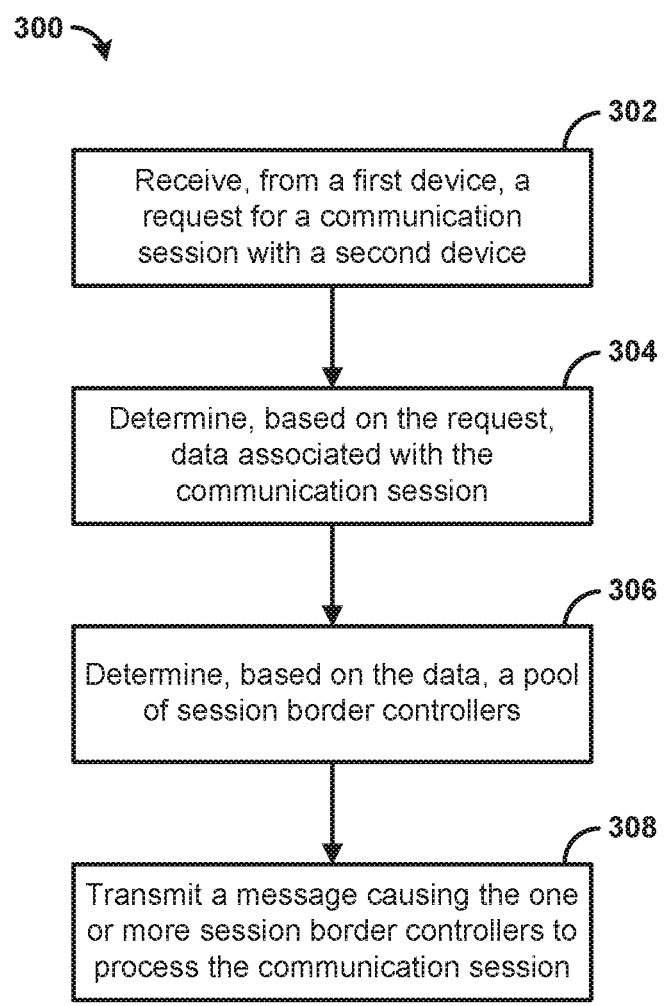
FIG. 3 is a flowchart of another example method for processing communication sessions.

FIG. 3 is a flowchart of an example method 300 for processing communication sessions. At step 302, a request for a communication session can be received. The request can comprise a session initiation protocol invite message. The request for the communication session can be received from a first device. The first device can comprise a session border controller. The first device can comprise a session device configured to process (e.g., establish, route, manage, maintain, support) communication sessions. The request can comprise a request to establish the communication session with a second device. The request can be received by a third device. The third device can comprise a redirect server, such as a SIP redirect server. The request can be received indirectly (e.g., or in some scenarios directly) from a source device. For example, a source device can attempt to establish a communication session with the second device (e.g., a target device).

At step 304, based on the request, data associated with the communication session can be determined (e.g., by the third device). The data can comprise session description data. The session description data can comprise data formatted according to a session description protocol. The session description data can comprise a session description section, a time description section, a media description section, and/or the like. The session description data can comprise parameters (e.g., proposed parameters, initialization parameters) for the communication session. The parameters can specify values for codecs, protocols, protocol versions, modes, routes, a resolution, a bit rate, a format, and/or the like.

Determining the data associated with the communication session can comprise determining a codec proposed by the request. The codec can be one of a plurality of codecs proposed in the request. The plurality of codecs can be listed in order of preference (e.g., with the highest preference listed first, or otherwise indicated). The codec can be determined from a media description section of session description data. The codec can be determined from a media attribute. The media attribute can be associated with (e.g., follow) a media descriptor field. The media attribute can comprise an rtpmap attribute configured to map an RTP payload type number (e.g., as used in a media descriptor field/line) to an encoding name denoting the payload format to be used. The RTP payload type number can be a number associated with a particular codec. For example, the codec can be determined based on the RTP payload type number, a name of the code (e.g., in the media attribute), any other appropriate identifier, and/or the like.

Determining the data can comprise determining a version of a protocol, such as IPv4 or IPv6. The version of the protocol can be determined from a connection information field (e.g., or connection data field, indicated as "c="). The connection information field can comprise the version of the protocol. For example, the connection information field can comprise an address type field comprising an identifier of the protocol. For example, IPv4 can be identified as IP4. IPv6 can be identified as IP6. The protocol can be determined based on the identifier in the address type field.

At step 306, a pool of session border controllers can be determined (e.g., by the third device). The pool of session border controllers can be determined by analyzing the session description data. The session description data can be analyzed based on one or more rules associating types of data (e.g., session description data) with pools of session border controllers assigned to corresponding levels of complexity.

The levels of complexity can relate to processing complexity, data complexity (e.g., resolution, bit rate), processing cost (e.g., cost to process a type of communication session), and/or the like. The levels of data complexity can be established according to any appropriate scheme. The levels of data complexity can be assigned based on a scale from low to high or high to low. Each level can be represented by a number, a term, a symbol, and/or the like. The scale can be subdivided discretely or be continuous. For example, the levels of complexity can comprise low, medium, and high. As another example, the levels of complexity can be any number between two end points (e.g., 0 to 10, 1 to 100, 0 to 1000).

The one or more rules associating types of data with pools of session border controllers assigned to corresponding levels of complexity can comprise can comprise one or more rules that associate data types, such as High Definition (HD) codecs (e.g., AMR-WB), Standard Definition (SD) codecs, simple transcodes (e.g., G.711 to G.729), pass-through codecs, IPv4 sessions, IPv6 sessions, RFC 4733 DTMF transcoding, and/or the like, with corresponding levels of complexity, pools assigned to levels of complexity, and/or the like.

The one or more rules associating types of data with pools of session border controllers assigned to corresponding levels of complexity can comprise a rule associating codecs with corresponding pools of session border controllers assigned to corresponding levels of complexity. Each pool session border controllers can be assigned to process communication sessions of a corresponding processing complexity. The pool of session border controller determined in step 306 can be determined from the pools of session border controllers.

As an example, a lowest level of complexity can be associated with communication sessions where no transcoding is required (e.g., information is merely anchored or relayed). A low level of complexity can be associated with a first group of codecs (e.g., simple codecs), such as G.711 (PCMU or PCMA), G.729, telephone-event (e.g., inband DTMF based on RFC 4733), and/or the like. A medium level of complexity can be associated with a second group of codecs (e.g., standard definition codecs), such as ILBC, AMR (AMR Narrowband), and/or the like. The second group of codecs can require a higher level of complexity to process than the first group of codecs. A high level of complexity can be associated with a third group of codecs (e.g., high definition codecs), such as G.722, EVRCB, AMR-WB, and/or the like. The third group of codecs can require a higher level of complexity to process than the first group of codecs and the second group of codecs. In some scenarios, theses codecs may be assigned to different levels of complexity. For example, for a mobile voice provider whose subscriber endpoints support AMR-WB, the relative costs of processing codecs may be different than a service provider, such as a cable based provider.

The one or more rules can comprise a rule that associates versions of a protocol with corresponding processing complexities. For the example, the protocol can comprise Internet protocol (IP) version 4 or IP version 6. Analyzing the session description data can comprise analyzing each of a plurality of codecs based on the one or more rules. A first listed codec (e.g., or otherwise indicated as highest priority) can be given greater weight in the analysis than subsequently listed codecs in the session description data.

At step 308, a message can be transmitted (e.g., by the third device). The message can be configured to cause one or more devices (e.g., session border controllers) in the pool of session border controllers to manage the communication session. The message can be transmitted to the first device (e.g., a session border controller). For example, the message can be a redirect message, such as a SIP redirect message. The message can be transmitted to the pool of session border controllers (e.g., or one or more devices therein). For example, the message can comprise the request for the communication session (e.g., the original request can be forwarded to the pool or one or more devices in the pool of session border controllers).

Figure 4:
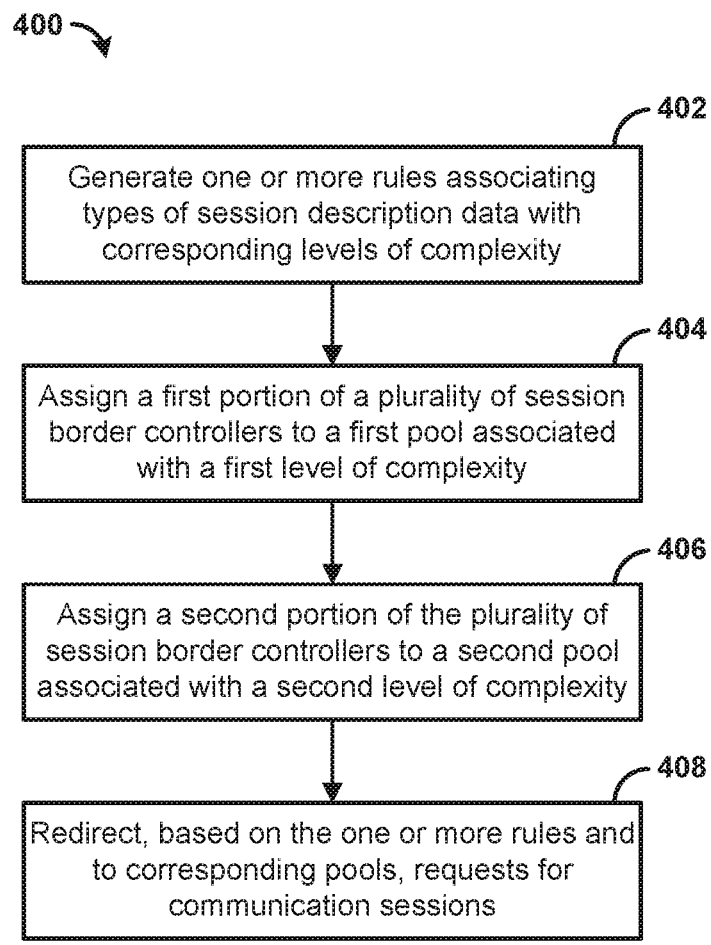
FIG. 4 is a flowchart of another example method for processing communication sessions.

FIG. 4 is a flowchart of an example method 400 for processing communication sessions. At step 402, one or more rules associating types of session description data with corresponding levels of complexity can be generated (e.g., by one or more devices managed by a service provider). The levels of complexity can comprise a first level of complexity. The levels of complexity can comprise a second level of complexity. The second level of complexity can be more complex than the first level of complexity. The levels of complexity can relate to processing complexity, data complexity (e.g., resolution, bit rate), processing cost (e.g., cost to process a type of communication session), and/or the like. Multiple levels of complexity beyond two levels are specifically contemplated.

The levels of data complexity can be established according to any appropriate scheme. The levels of data complexity can be assigned based on a scale from low to high or high to low. Each level can be represented by a number, a term, a symbol, and/or the like. The scale can be subdivided discretely or be continuous. For example, the levels of complexity can comprise low, medium, and high. As another example, the levels of complexity can be any number between two end points (e.g., 0 to 10, 1 to 100, 0 to 1000).

The one or more rules associating types of data with corresponding levels of complexity can comprise can comprise one or more rules that associate data types, such as High Definition (HD) codecs (e.g., AMR-WB), Standard Definition (SD) codecs, simple transcodes (e.g., G.711 to G.729), pass-through codecs, IPv4 sessions, IPv6 sessions, RFC 4733 DTMF transcoding, and/or the like, with corresponding levels of complexity.

The one or more rules associating types of data with corresponding levels of complexity can comprise a rule associating codecs with corresponding levels of complexity. The rule associating codecs with corresponding levels of complexity can assign greater weight to a codec based on a position of the codec within the session description data. As an example, a lowest level of complexity can be associated with communication sessions where no transcoding is required (e.g., information is merely anchored or relayed). A low level of complexity can be associated with a first group of codecs (e.g., simple codecs), such as G.711 (PCMU or PCMA), G.729, telephone-event (e.g., inband DTMF based on RFC 4733), and/or the like. A medium level of complexity can be associated with a second group of codecs (e.g., standard definition codecs), such as ILBC, AMR (AMR Narrowband), and/or the like. The second group of codecs can require a higher level of complexity to process than the first group of codecs. A high level of complexity can be associated with a third group of codecs (e.g., high definition codecs), such as G.722, EVRCB, AMR-WB, and/or the like. The third group of codecs can require a higher level of complexity to process than the first group of codecs and the second group of codecs. In some scenarios, theses codecs may be assigned to different levels of complexity. For example, for a mobile voice provider whose subscriber endpoints support AMR-WB, the relative costs of processing codecs may be different than a service provider, such as a cable based provider.

The one or more rules associating types of data with corresponding levels of complexity can comprise a rule that associates versions of internet protocol with corresponding levels of complexity. For example, the rule can associate internet protocol version 4 with the first level of complexity and internet protocol version 6 with the second level of complexity (e.g., or vice versa).

At step 404, a first portion of a plurality of session border controllers can be assigned (e.g., by one or more devices managed by a service provider) to a first pool associated with the first level of complexity. The first pool can be for processing communication sessions having the first level of complexity. Information can be stored for a plurality of session border controllers (e.g., or pools of session border controllers). The information can comprise capability information (e.g., capability level, protocols supported), cost information (e.g., level of cost, cost per transaction), management information (e.g., entity managing, servicing, and/or owning the session border controller), location information (e.g., geographic location, network location), and/or the like. The information can be used to group and/or assign session border controllers as corresponding pools. The assignments can be done automatically or manually. The assignments can change over time. For example, as the information changes (e.g., change in cost, change in capability, change in location), session border controllers can be reassigned (e.g., in response to triggering condition being met, such a change in the information or the passing of a time interval) to corresponding pools.

At step 406, a second portion of the plurality of session border controllers can be assigned (e.g., by one or more devices managed by a service provider) to a second pool associated with the second level of complexity. The second pool can be for processing communication sessions associated with the second level of complexity. For example, the second level of complexity can comprise a higher level of complexity than the first level of complexity. The first level of complexity can comprise the medium level or the low level of complexity. The second level of complexity can comprise the high level of complexity. The first level of complexity can be for standard definition codecs (e.g., or simple codecs, pass through codecs). The second level of complexity can be for high definition codecs.

The second pool can be managed by a party generating the one or more rules. The first pool can be managed by a third party. For example, the third party can manage a cloud based processing service. The cloud based processing service can implement the session border controllers via virtual machines and/or physical devices. In some scenarios, the first pool and the second pool can be managed by the same entity, such as the service provider. Additionally, the first pool can be managed by the third party. The second pool can be managed by the service provider.

At step 408, one or more requests for communication sessions can be redirected. The one or more requests can be redirected to corresponding pools of the first pool and the second pool. The one or more requests can be redirected by one or more devices managed by a service provider, such as a session border controller or a redirect server. The requests can be redirected based on the one or more rules. Session description data in the requests for communication sessions can be determined. The corresponding pools can be selected based on the session description data. For example, the session description data can be analyzed based on the one or more rules. In some scenarios, the one or more rules can be used to generate additional rules. The additional rules can associate data types directly with corresponding pools (e.g., based on both being associated with the same level of complexity). Thus, the additional rules may match data types directly to pools instead to levels of complexity. The additional rules can be used to analyze the session description data to redirect communication sessions.

Figure 5:
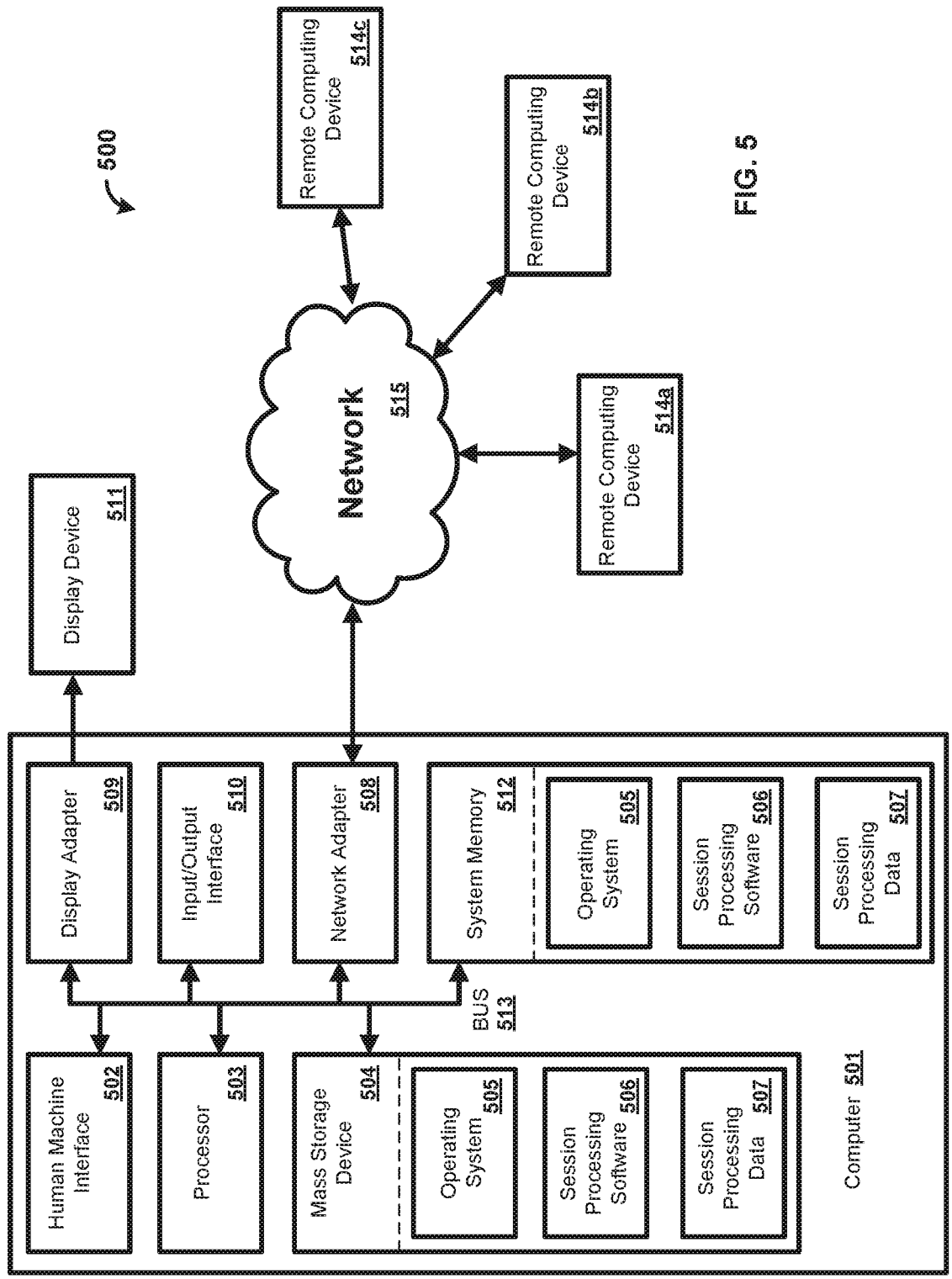
FIG. 5 is a block diagram of an example computing device for implementing the present methods and systems.

The methods and systems can be implemented on a computer 501 in FIG. 5 and described below. By way of example, the source 108, the first session device 102, the first redirect device 112, the second redirect device 114, the target 110, the first pool 104 of session devices, and the second pool 106 of session devices shown in FIG. 1 can comprise one or more computers in FIG. 5. Similarly, the methods and systems disclosed can utilize one or more computers to perform one or more functions in one or more locations. FIG. 5 is a block diagram of an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components in the example operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a. Personal Computer Memory Card Industry Association (PCM-CIA), Universal Serial Bus (USB) and the like. The bus 513, and all buses specified in this description can also be implemented over a wired or wireless network connection and each of the subsystems, including the one or more processors 503, a mass storage device 504, an operating system 505, session processing software 506, session processing data 507, a network adapter 508, the system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Example readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the session processing data 507 and/or program modules such as the operating system 505 and the session processing software 506 that are immediately accessible to and/or are presently operated on by the one or more processors 503.

Additionally, the computer 501 can also comprise other removable/non-removable, volatile/non-volatile computer storage media. By way of example, the mass storage device 504 in FIG. 5 can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like.

Optionally, any number of program modules can be stored on the mass storage device 504, including by way of example, the operating system 505 and the session processing software 506. Each of the operating system 505 and the session processing software 506 (or some combination thereof) can comprise elements of the programming and the session processing software 506. The session processing data 507 can also be stored on the mass storage device 504. The session processing data 507 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

The user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

The display device 511 can also be connected to the system bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For example purposes, application programs and other executable program components such as the operating system 505 are depicted as discrete blocks, although it is recognized that such programs and components reside at various times in different storage components of the computing device 501, and are executed by the one or more processors 503 of the computer. An implementation of the session processing software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with specific examples, it is not intended that the scope be limited to the particular examples set forth, as the examples herein are intended in all respects to be example rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations can be made without departing from the scope or spirit. Other examples will be apparent to those skilled in the art from consideration of the specification and practice disclosed herein. It is intended that the specification and examples be considered as example only, with a true scope and spirit being indicated by the following claims.

What is claimed is:

1. A method comprising:
    receiving, from a first device, a request for a communication session with a second device;
    determining, based on the request, session description data associated with the communication session;
    determining, based on the session description data and on one or more rules associating types of data with corresponding levels of complexity, a complexity of the communication session;
    determining, based on the complexity of the communication session, one or more session border controllers; and
    sending, to the first device, a redirect message that causes the first device to communicate with the one or more session border controllers for the communication session.

2. The method of claim 1, wherein the session description data comprises at least one of: an indication of at least one codec, an indication of at least one communication protocol, an indication of a bit rate, or an indication of a type of transcode.

3. The method of claim 1, wherein the session description data indicates a type of data and wherein the complexity of the communication session is based on a rule of the one or more rules that associates the type of data with the complexity of the communication session.

4. The method of claim 1, wherein the one or more rules associating the types of data with the corresponding levels of complexity comprise at least one of:

one or more rules associating types of codecs with the corresponding levels of complexity,
one or more rules associating versions of a communication protocol with the corresponding levels of complexity,
one or more rules associating bitrates with the corresponding levels of complexity, or
one or more rules associating a type of transcode with the corresponding levels of complexity.

5. The method of claim 1, wherein the request comprises a session initiation protocol invite message.

6. The method of claim 1, wherein determining the one or more session border controllers comprises determining the one or more session border controllers based on the one or more session border controllers being associated with a pool of session border controllers, of a plurality of pools of session border controllers, assigned to process communication sessions associated with the complexity of the communication session.

7. A method comprising:
receiving, from a first device, a request for a communication session with a second device;
determining, based on the request, session description data associated with the communication session;
determining, based on the session description data and one or more rules associating types of data with pools of session border controllers assigned to corresponding levels of complexity, a pool of session border controllers; and
sending a message that causes one or more session border controllers, associated with the pool of session border controllers, to facilitate the communication session.

8. The method of claim 7, wherein the session description data comprises at least one of: determining an indication of at least one codec, an indication of at least one communication protocol, an indication of a bit rate, or an indication of a type of transcode.

9. The method of claim 7, wherein the one or more rules associating the types of data with the pools of session border controllers assigned to the corresponding levels of complexity comprise at least one of:
one or more rules associating types of codecs with corresponding pools of session border controllers assigned to the corresponding levels of complexity;
one or more rules associating versions of a communication protocol with the corresponding pools of session border controllers assigned to the corresponding levels of complexity,
one or more rules associating bitrates with the corresponding pools of session border controllers assigned to the corresponding levels of complexity, or
one or more rules associating types of transcodes with the corresponding pools of session border controllers assigned to the corresponding levels of complexity.

10. The method of claim 7, wherein the levels of complexity are associated with at least one of: a data complexity, a processing cost, a resolution, or a bit rate.

11. The method of claim 7, wherein the session description data indicates a type of data and wherein determining the pool of session border controllers is based on a rule of the one or more rules that associates the type of data with the pool of session border controllers.

12. The method of claim 7, wherein the request comprises a session initiation protocol invite message.

13. A system comprising:
a first device configured to:
send a request for a communication session with a second device; and
a network device configured to:
receive the request,
determine, based on the request, session description data associated with the communication session,
determine, based on the session description data and on one or more rules associating types of data with corresponding levels of complexity, a complexity of the communication session,
determine, based on the complexity of the communication session, one or more session border controllers, and
send, to the first device, a redirect message that causes the first device to communicate with the one or more session border controllers for the communication session.

14. The system of claim 13, wherein the session description data comprises at least one of: an indication of at least one codec, an indication of at least one communication protocol, an indication of a bit rate, or an indication of a type of transcode.

15. The system of claim 14, wherein the session description data indicates a type of data and wherein the complexity of the communication session is based on a rule of the one or more rules that associates the type of data with the complexity of the communication session.

16. The system of claim 13, wherein the network device is further configured to determine the one or more session border controllers based on the one or more session border controllers being associated with a pool of session border controllers assigned to process communication sessions associated with the complexity of the communication session.

17. The system of claim 13, wherein the request for the communication session comprises a session initiation protocol invite message.

18. The method of claim 1, wherein the levels of complexity are associated with at least one of: a data complexity, a processing cost, a resolution, or a bit rate.

19. The system of claim 13, wherein the levels of complexity are associated with at least one of: a data complexity, a processing cost, a resolution, or a bit rate.

20. The system of claim 13, wherein the one or more rules associating types of data with the corresponding levels of complexity comprise at least one of:
one or more rules associating types of codecs with the corresponding levels of complexity,
one or more rules associating versions of a communication protocol with the corresponding levels of complexity,
one or more rules associating bitrates with the corresponding levels of complexity, or
one or more rules associating a type of transcode with the corresponding levels of complexity.

* * * * *